(12) United States Patent
Peoples et al.

(10) Patent No.: US 8,402,046 B2
(45) Date of Patent: Mar. 19, 2013

(54) CONCEPTUAL REVERSE QUERY EXPANDER

(75) Inventors: Bruce E. Peoples, State College, PA (US); Brian J. Simpson, State College, PA (US); Michael R. Johnson, State College, PA (US)

(73) Assignee: Raytheon Company, Waltham, MA (US)

( * ) Notice: Subject to any disclaimer, the term of this patent is extended or adjusted under 35 U.S.C. 154(b) by 570 days.

(21) Appl. No.: 12/039,068

(22) Filed: Feb. 28, 2008

(65) Prior Publication Data

US 2009/0222409 A1 Sep. 3, 2009

(51) Int. Cl.
*G06F 7/00* (2006.01)
*G06F 17/00* (2006.01)
*G06F 17/30* (2006.01)
*G06F 17/20* (2006.01)
*G06F 17/27* (2006.01)

(52) U.S. Cl. ............ 707/760; 707/765; 707/766; 704/8; 704/9

(58) Field of Classification Search .................. None
See application file for complete search history.

(56) References Cited

U.S. PATENT DOCUMENTS

| | | | | |
|---|---|---|---|---|
| 6,510,406 B1 * | 1/2003 | Marchisio | | 704/9 |
| 2002/0111941 A1 * | 8/2002 | Roux et al. | | 707/3 |
| 2004/0039564 A1 * | 2/2004 | Mueller | | 704/9 |
| 2004/0102957 A1 * | 5/2004 | Levin | | 704/3 |
| 2006/0080107 A1 * | 4/2006 | Hill et al. | | 704/275 |
| 2006/0161554 A1 * | 7/2006 | Lucovsky et al. | | 707/10 |
| 2007/0250493 A1 | 10/2007 | Peoples et al. | | |
| 2007/0250494 A1 | 10/2007 | Peoples et al. | | |

FOREIGN PATENT DOCUMENTS

| | | |
|---|---|---|
| WO | WO 2007/123838 | 11/2007 |
| WO | WO-2009/108587 A1 | 9/2009 |

OTHER PUBLICATIONS

PCT, "Notification of Transmittal of the International Search Report and the Written Opinion of the International Searching Authority, or the Declaration," International Application No. PCT/US2009/034811, May 15, 2009, 13 pages.
"International Application Serial No. PCT/US2009/034811, International Preliminary Report on Patentability mailed Aug. 31, 2010", 6 pgs.
"International Application Serial No. PCT/US2009/034811, International Search Report mailed May 15, 2009", 2 pgs.
"International Application Serial No. PCT/US2009/034811, Written Opinion mailed May 15, 2009", 5 pgs.

* cited by examiner

*Primary Examiner* — Susan Chen
(74) *Attorney, Agent, or Firm* — Schwegman Lundberg & Woessner, P.A.

(57) ABSTRACT

A method for multilingual data querying comprises sending one or more words in an original language to a word ontology. The method further comprises receiving sense descriptions of the one or more words from the word ontology, and selecting one or more sense descriptions of the one or more words and a language for querying. The method further comprises translating the one or more sense descriptions into the language for querying, and also translating the one or more sense descriptions back into the original language for verification. The method further comprises selecting at least one of the one or more sense descriptions to use in a query.

20 Claims, 1 Drawing Sheet

CONCEPTUAL REVERSE QUERY EXPANDER

TECHNICAL FIELD

This disclosure relates in general to querying information sources, and more particularly to querying using a conceptual definition.

BACKGROUND

Querying documents in a language other than the user's native language can present a number of challenges. For example, translating a word from a foreign language into the user's native language may not always result in an accurate translation due to some words having more than one meaning. This can make it difficult for user with little knowledge of a foreign language to search for information stored in documents in that foreign language. Some querying resources allow for the use of conceptual information to improve the results of the queries. However, existing methods can still have trouble providing accurate translations.

SUMMARY OF EXAMPLE EMBODIMENTS

In accordance with one embodiment of the present disclosure, a method for multilingual data querying comprises sending one or more words in an original language to a word ontology. The method further comprises receiving sense descriptions of the one or more words from the word ontology, and selecting one or more sense descriptions of the one or more words and a language for querying. The method further comprises translating the one or more sense descriptions into the language for querying, and also translating the one or more sense descriptions back into the original language for verification. The method further comprises selecting at least one of the one or more sense descriptions to use in a query.

In accordance with another embodiment of the present disclosure, a method for multilingual data querying, comprises translating one or more sense descriptions from an original language into a foreign language. The method further comprises translating the one or more sense descriptions back into the original language, and selecting at least one of the one or more sense descriptions to use in a query.

Embodiments of the disclosure may provide numerous technical advantages. Some, none, or all embodiments may benefit from the below described advantages. Queries performed on a database of foreign language documents may provide more accurate results than previous known methods. Further, more relevant data may be returned to a user, along with less irrelevant data.

Other technical advantages of the present disclosure will be readily apparent to one skilled in the art from the following figures, descriptions, and claims. Moreover, while specific advantages have been enumerated above, various embodiments may include all, some, or none of the enumerated advantages.

DETAILED DESCRIPTION

The disclosed approach, in certain embodiments, can improve the ability to find information of interest in foreign language documents. Conceptual Reverse Query Expansion (CRQE) can handle multiple languages for conceptual query formation, conceptual query execution, and conceptual query results. One aspect of CRQE is disambiguation of a concept to be used in a query. CRQE allows a user to be a part of the disambiguation process by selecting specific sense information to form a concept to be used by the conceptual query algorithms. This can make conceptual queries more accurate and can tailor them to a user specific context.

One problem with querying foreign language documents is that an English word can have multiple definitions ("senses"). For example, the word "spy" can be a verb meaning "catch sight of." Or alternatively, the word "spy" could mean "a secret agent hired to obtain information." In other cases, metaphors, synonyms, homonyms, and slang can make disambiguation difficult and inexact. Further, dictionaries will provide different divisions of words into senses, and these divisions vary by type of dictionary. Cross-cultural word and concept disambiguation can also present problems. A CRQE process can allow a user from one culture and native language to query and obtain relevant information from document sets in a foreign language, even if the user is not familiar with the foreign language.

Figure 1:
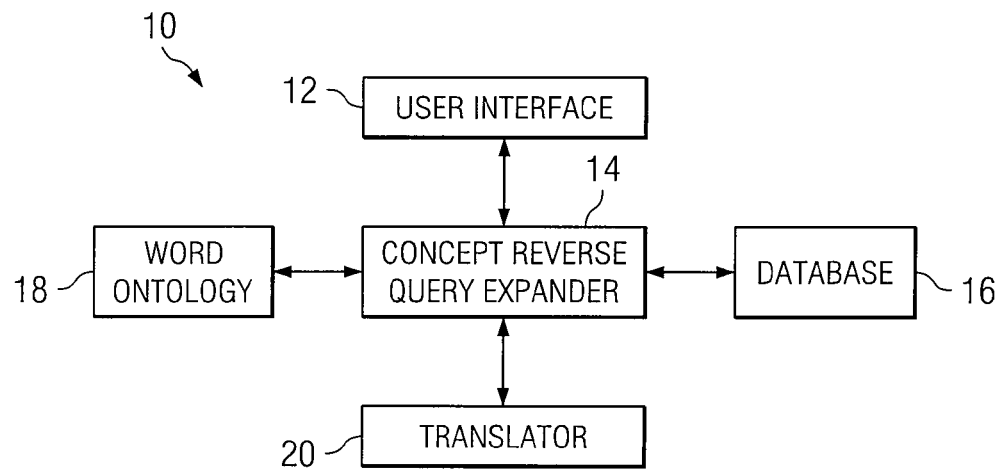
FIG. 1 illustrates a system for implementing a conceptual reverse query expander.

FIG. 1 shows one example of a system 10 operable to execute a CRQE process. System 10 comprises a user interface 12. User interface 12 can be, for example, a personal computer with a mouse and keyboard for input and a display for output. User interface 12 can also include a processor, memory, and various hardware and/or software for operating programs and interacting with a user. As another example, user interface 12 could be a handheld device, such as a personal digital assistant, operable to allow a user to execute a CRQE process.

System 10 also comprises a CRQE processor 14. CRQE processor 14 is operable to interact with the other components of system 10 and manage the conceptual queries. CRQE processor 14 can be comprised of hardware, software, or a combination of software and hardware. CRQE processor 14 can perform a variety of functions during a conceptual query, as described further below.

System 10 further comprises database 16. Database 16 can comprise any collection of documents that will be queried by a user. For example, database 16 could be a collection of documents found on the Internet that a user wants to query. Or database 16 could be one or more files collected by an intelligence agency and sent to an analyst for analysis. Database can also comprise a collection of databases in various locations.

Word ontology 18 is any system, method, or process that can be used to obtain word senses of the term being searched for. One example of a word ontology is Princeton's University's WordNet. WordNet is a large lexical database of the English language. WordNet groups words into sets of cognitive synonyms, each expressing a distinct concept. Word ontology 18 provides the user with word senses and sense definitions to choose from during a query process.

System 10 further comprises translator 20. Translator 20 can comprise one or more language translators used for the various steps of a query process, including translations and reverse translations. Different language translators can be used for performing different translations during the process, or the same translator can be used for each step. Furthermore, different translators may be selected for use with different languages to produce more accurate results.

A CRQE process can begin with a user inputting a term that will be searched for in the foreign document set. In this example, the user's native language will be English. Also in this example, the documents that the user wants to search will be in Spanish. These are merely examples, as a CRQE process can be used with any language comprising the native language and any language comprising the language the documents are stored in. The user can input one or more search terms with user interface 12, using a variety of methods. As one example, a user may type the one or more terms into a graphical user interface provided by CRQE processor 14. The one or more search terms is sent to word ontology 18. Word ontology 18 returns the senses of the term or terms to the user. For example, if the user inputs the term "spy," word ontology 18 will return a number of senses of the word "spy." As discussed above, "spy" can be a noun or a verb. Word ontology 18 can return both of these senses, along with the various definitions of the word "spy." Word ontology 18 can also return other senses of the search term if it finds any. The user can choose the definition or definitions of the word that most closely matches what the user is searching for. In this example, the user may want to search for the word "spy" as a noun meaning "a secret agent hired by a state to obtain information about its enemies or by a business to obtain industrial secrets from competitors." The user can also select the language that he wants to search in (in this example, Spanish). CRQE systems can be created that only search in one particular language, or they can be operable to perform searches in a variety of languages. Different translators and word ontologies may be used depending on which language or languages the system is operable to perform searches in. In certain embodiments, translators and word ontologies may perform differently depending on the language they are used for.

When the user receives the selected sense description or descriptions of the word and selects a language, he can translate the sense description(s) into Spanish. The user may have selected more than one sense descriptions, in which case he can choose to translate none, one, or more than one sense descriptions. Translator 20 can perform the translation. In system 10, translator 20 also performs the additional step of translating the sense description from Spanish back into English (a reverse translation). Sometimes this will not result in an exact translation back into English, but may just be an approximation due to the limitations of machine translators. This step is performed so that the user can verify that the sense description has been accurately translated into Spanish by translator 20. CRQE processor 14 returns the original sense description, the Spanish sense description, and the reverse translation (English) sense description back to the user through user interface 12. The user does not have to have any familiarity with Spanish to verify that the sense description translation is accurate; he can compare the original sense description with the reverse translation. If the user feels the reverse translation is accurate enough for his purposes, the user can verify the translation.

Once the user has verified the translation, one or more queries can be executed on the Spanish language documents in database 16. The conceptual search algorithms use the selected word senses in query execution. The search algorithms find the documents containing the query word sense and those documents are translated into English and sent to the user. For example, the word sense for spy, "a secret agent hired by a state to obtain information about its enemies or by a business to obtain industrial secrets from competitors," may be used by the search algorithm to find documents based on the word sense of "a secret agent hired by a state to obtain information about its enemies or by a business to obtain industrial secrets from competitors." The documents returned might contain the term spy, or other related single and compound terms, or phrases such as "industrial espionage," "espionage," "theft of trade secrets," etc. In some embodiments, it is preferable that the same translator 20 that translated the sense description is used to translate the relevant documents. The original documents, in Spanish, can be presented to the user along with the translated documents. The user can then perform further analysis of the documents, or perform further queries.

Also, in certain embodiments results can be improved by using the same tools and components in the query that were used to index the documents in database 16. For example, various morphological analyzers, lexers, taxonomies, dictionaries, optical character recognizers, and translators can be used in querying the documents in database 16, along with a variety of other components. Search results can be improved in various embodiments if these same components are used to index the documents before the query is performed. As an example, in one embodiment Oracle 10 g can be used to index the documents. Other indexing products that can be used include RetrievalWare and Autonomy. When a document set is indexed, various tools can be used, including but not limited to transcoders, morphological analyzers, lexers, taxonomies, dictionaries, translators, optical character recognizers, part of speech identifiers, extractors, taggers, indexers, gisters, and various types of language ontological constructs. The number, type, and quality of these components available for each language vary. Different combinations of these tools may also be better suited for different tasks. However, it can often improve the query results if the same tools used for the indexing of the documents are also used for querying the documents and/or translating the documents.

Figure 2:
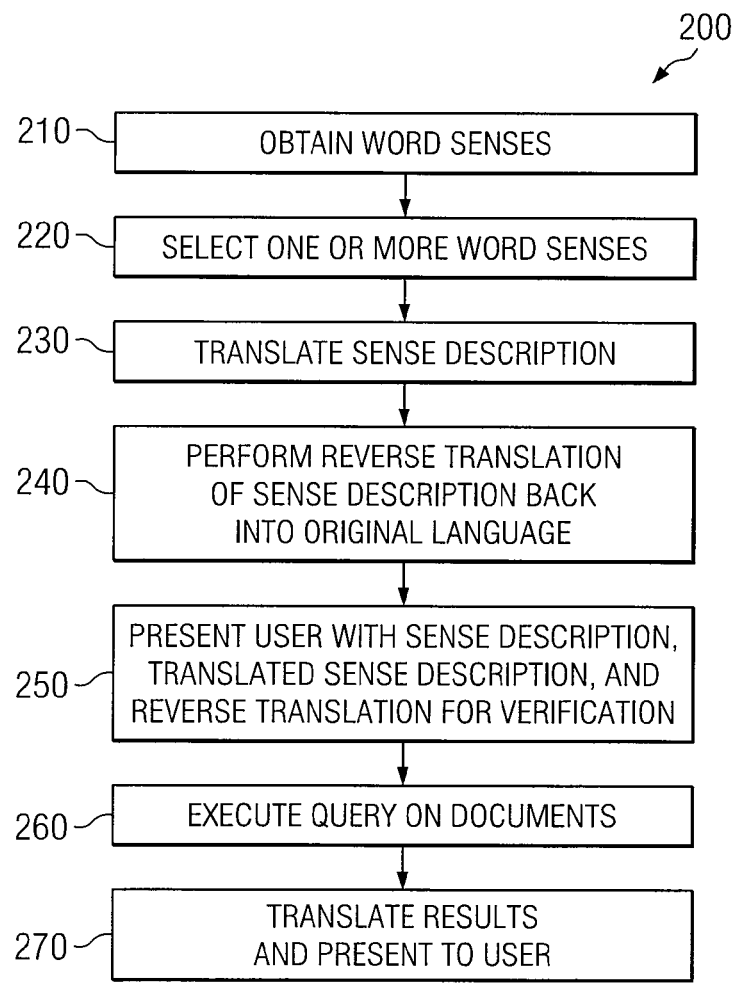
FIG. 2 is a flowchart illustrating an example method of conceptual reverse query expansion.

FIG. 2 is a flowchart illustrating an example method 200 of a CRQE process. In particular, the illustrated technique can increase the accuracy of a query performed on documents in a foreign language. The steps illustrated in FIG. 2 may be combined, modified, or deleted where appropriate. Additional steps may also be added to the example operation. Furthermore, the described steps may be performed in any suitable order. In step 210, word senses are obtained from one or more word ontologies. As discussed above, one such word ontology is Princeton WordNet, which can return one or more sense descriptions of a search term. In step 220, the user selects one or more of the word senses to use in querying the documents. The user may want to focus on only one of the definitions of the search term, or may want to search for the term when it is used as a certain part of speech. As discussed in the example above, the user may want to search for the word "spy" when used as a noun. The user can select that sense using a user interface and the process can proceed to the next step.

In step 230, the sense description selected by the user is translated into the target language. Preferably, the same translator is used to perform all the translations in the CRQE process. More accurate results can generally be achieved when consistent components are used for the steps in the process. In step 240, the sense description is translated from the foreign language back into the original language. For example, if an English language user wants to query stored documents that are in Arabic, step 230 would translate the sense description into Arabic. Then, in step 240, the Arabic sense description would be translated back into English.

In step 250, the user is presented with the original sense description that he selected from the word ontology, the sense description translated into the target language, and the sense description translated back into the original language. With these three sense descriptions, the user can verify that the translator has produced a faithful translation of the sense description. If it has not, the user can reject the translation and try again, perhaps using a different translator or a sense description from a different word ontology. If the translation is accurate, the user can then proceed to step 260, and execute the query on the documents. In this step, one or more components may be used to query the documents for the search term. In step 270, the results of the query are translated into the original language and presented to the user. This step may result in hundreds or thousands of documents, depending on the size of the document database and the query. In certain embodiments, the user can select a maximum number of documents that he wants returned from the query, or set other constraints on the query. The components used to execute the query can choose the best documents to present to the user, or can decide which documents to present to the user using any suitable method. In some embodiments, it can also be advantageous to use the same translator to translate the results that was used to translate the sense descriptions in step 230. This can provide uniformity across translation results, increasing the accuracy of the query.

The processes described in this disclosure are not limited to use with the described hardware or software. They may be performed on any suitable computing or processing environment and with any machine or machines capable of running a computer program or computer logic. The processes may be implemented in hardware, software, or a combination of the two. The processes may be implemented in computer programs executed on machines that include a processor, storage medium, and one or more input and output devices.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for multilingual data querying, comprising:
   sending, by a computer system, one or more words in an original language to a word ontology;
   receiving, by the computer system, sense descriptions of the one or more words from the word ontology;
   receiving a selection of one or more sense descriptions of the one or more words and a second language other than the original language for querying;
   translating, by the computer system, the one or more sense descriptions of the selection into the second language for querying, wherein the translating of the one or more sense descriptions of the selection into the second language generates one or more sense descriptions in the second language;
   translating, by the computer system, the one or more sense descriptions in the second language back into the original language, wherein the translating of the one or more sense descriptions in the second language back into the original language generates one or more reverse-translated sense descriptions for verification; and
   executing, by the computer system and in response to receiving a verification of the one or more reverse-translated sense descriptions, a query using the one or more sense descriptions in the second language.

2. The method of claim 1, wherein executing the query using the one or more sense descriptions in the second language comprises querying one or more documents in the second language.

3. The method of claim 2, wherein the method further comprises translating one or more query results into the original language.

4. The method of claim 1, wherein each sense description of the one or more words from the word ontology is a conceptual definition of the one or more words.

5. The method of claim 3, wherein the method further comprises displaying the results on an electronic display.

6. The method of claim 1, wherein sending one or more words to a word ontology comprises sending the one or more words to PRINCETON UNIVERSITY'S WORDNET®.

7. The method of claim 1, wherein the method further comprises parsing one or more words from one or more documents into tokens.

8. The method of claim 1, wherein sending one or more words to a word ontology further comprises sending a part of speech to the word ontology.

9. The method of claim 2, wherein the method further comprises selecting the maximum number of query results to be returned.

10. The method of claim 1, wherein translating the one or more sense descriptions into the second language for querying further comprises selecting one or more translation programs to perform the translation.

11. A method for multilingual data querying, comprising:
    translating, by a computer system, one or more sense descriptions from an original language into a foreign language, wherein the translating of the one or more sense descriptions from an original language into a foreign language generates one or more sense descriptions in the foreign language;
    translating, by the computer system, the one or more sense descriptions in the foreign language back into the original language, wherein the translating of the one or more sense descriptions in the foreign language back into the original language generates one or more reverse-translated sense descriptions; and
    executing, by the computer system and in response to receiving a verification of the one or more reverse-translated sense descriptions, a query using the one or more sense descriptions in the second language.

12. The method of claim 11, wherein executing the query using the one or more sense descriptions in the second language comprises querying one or more documents in the second language.

13. The method of claim 12, further comprising translating one or more query results into the original language.

14. The method of claim 11, wherein translating the one or more sense descriptions into a foreign language further comprises selecting one or more translation programs to perform the translation.

15. A system for multilingual data querying, comprising:
    an interface operable to allow a user to select one or more words in an original language;
    a processor operable to access one or more document databases and execute one or more programs;
    a translator operable to translate one or more sense descriptions of the one or more words into one or more new sense descriptions in a second language, and further operable to translate the one or more new sense descriptions back into the original language, wherein the translating of the one or more sense descriptions in the second language back into the original language generates one or more reverse-translated sense descriptions;
    an electronic display operable to display the one or more sense descriptions, the one or more new sense descriptions in a second language, and the one or more reverse-translated sense descriptions; and
    a querying program operable to execute, in response to receiving a verification of the one or more reverse-translated sense descriptions, a query using the one or more sense descriptions in the second language.

16. The system of claim 15, further comprising one or more indexing components used to index documents in the one or more document databases.

17. The system of claim 15, wherein the translator comprises one or more translating components.

18. The system of claim 15, wherein the querying program is further operable to return one or more query results to the user.

19. The system of claim 18, wherein the translator is further operable to translate one or more of the one or more query results into the original language.

20. The system of claim 19, wherein one or more of the one or more indexing components used to index documents are used by the translator to translate one or more of the one or more query results into the original language.

* * * * *